(12) United States Patent  
Gumaer (10) Patent No.: US 9,000,736 B2  
(45) Date of Patent: Apr. 7, 2015

(54) POWER FACTOR CORRECTION ALGORITHM FOR ARBITRARY INPUT WAVEFORM

(71) Applicant: Traver Gumaer, Easthampton, MA (US)

(72) Inventor: Traver Gumaer, Easthampton, MA (US)

(73) Assignee: Cooper Technologies Company, Houston, TX (US)

( * ) Notice: Subject to any disclaimer, the term of this patent is extended or adjusted under 35 U.S.C. 154(b) by 159 days.

(21) Appl. No.: 13/887,210

(22) Filed: May 3, 2013

(65) Prior Publication Data

US 2014/0327411 A1 Nov. 6, 2014

(51) Int. Cl.  
*G05F 1/652* (2006.01)  
*H02M 1/42* (2007.01)

(52) U.S. Cl.  
CPC ............. *H02M 1/42* (2013.01); *H02M 1/4225* (2013.01)

(58) Field of Classification Search  
USPC .................. 323/205, 207, 222, 282, 283, 285  
See application file for complete search history.

(56) References Cited

U.S. PATENT DOCUMENTS

| | | | |
|---|---|---|---|
| 4,386,395 A | 5/1983 | Francis, Jr. | |
| 4,683,529 A | 7/1987 | Bucher, II | |
| 5,367,247 A | 11/1994 | Blocher et al. | |
| 5,568,041 A | 10/1996 | Hesterman | |
| 5,598,326 A | 1/1997 | Liu et al. | |
| 5,614,812 A | 3/1997 | Wagoner | |
| 5,631,550 A | 5/1997 | Castro et al. | |
| 5,650,925 A | 7/1997 | Hesterman | |
| 5,682,306 A | 10/1997 | Jansen | |
| 5,804,950 A | 9/1998 | Hwang et al. | |
| 5,838,181 A | 11/1998 | Hesterman | |
| 5,844,399 A * | 12/1998 | Stuart ........................... | 323/282 |
| 6,043,633 A | 3/2000 | Lev et al. | |
| 6,177,782 B1 * | 1/2001 | L'Hermite et al. ........... | 323/222 |
| 6,259,613 B1 | 7/2001 | Lee et al. | |
| 6,657,417 B1 * | 12/2003 | Hwang ......................... | 323/222 |
| 6,906,503 B2 | 6/2005 | Lopez-Santillana et al. | |

(Continued)

FOREIGN PATENT DOCUMENTS

| | | |
|---|---|---|
| JP | 2001037252 | 2/2001 |
| JP | 2010115088 | 5/2010 |

(Continued)

OTHER PUBLICATIONS

Lopatkina, R., International Search Report and Written Opinion of the International Searching Authority for PCT/US2014/036248, Sep. 4, 2014, pp. 1-7.

(Continued)

*Primary Examiner* — Adolf Berhane  
(74) *Attorney, Agent, or Firm* — King & Spalding LLP (57) ABSTRACT

The present disclosure provides techniques for a power factor correction system having an arbitrary input waveform. The present disclosure provides two example methods of digital power factor correction that allow for a high power factor on an arbitrary input waveform. The two example methods are applicable to both constant-current inputs and constant-voltage inputs. One example method samples the arbitrary input waveform to produce a reference table used to synchronize the input voltage with the input current in a constant current system, and to synchronize the input current to the input voltage in a constant voltage system. A second example method uses instantaneous input values as a reference in performing power factor correction.

20 Claims, 5 Drawing Sheets

(56) References Cited

U.S. PATENT DOCUMENTS

| | | | |
|---|---|---|---|
| 6,909,622 | B2 | 6/2005 | Weng |
| 7,088,079 | B2 | 8/2006 | Lefedjiev |
| 7,180,273 | B2 | 2/2007 | Bocchiola et al. |
| 7,205,749 | B2 | 4/2007 | Hagen et al. |
| 7,269,038 | B2 | 9/2007 | Shekhawat et al. |
| 7,279,876 | B2 | 10/2007 | Adragna et al. |
| 7,323,851 | B2 | 1/2008 | Markowski |
| 7,394,236 | B2 * | 7/2008 | Chapuis et al. ............... 323/283 |
| 7,456,621 | B2 | 11/2008 | Leung et al. |
| 7,489,116 | B2 | 2/2009 | Lanni |
| 7,554,310 | B2 * | 6/2009 | Chapuis et al. ............... 323/282 |
| 7,723,964 | B2 * | 5/2010 | Taguchi ........................ 323/222 |
| 7,746,040 | B2 | 6/2010 | Garrity et al. |
| 7,821,237 | B2 * | 10/2010 | Melanson .................... 323/222 |
| 7,889,517 | B2 | 2/2011 | Artusi et al. |
| 7,919,958 | B2 | 4/2011 | Oettinger et al. |
| 8,014,176 | B2 | 9/2011 | Melanson et al. |
| 8,076,920 | B1 | 12/2011 | Melanson |
| 8,094,472 | B2 | 1/2012 | Chang et al. |
| 8,125,197 | B2 | 2/2012 | Hwang et al. |
| 8,129,958 | B2 | 3/2012 | Ku et al. |
| 8,130,522 | B2 | 3/2012 | Maksimovic |
| 8,207,713 | B2 | 6/2012 | Sugawara |
| 8,228,046 | B2 | 7/2012 | Ingemi et al. |
| 8,248,145 | B2 | 8/2012 | Melanson |
| 8,270,190 | B2 | 9/2012 | Adragna |
| 8,279,630 | B2 | 10/2012 | Choi |
| 8,558,518 | B2 | 10/2013 | Irissou et al. |
| 8,587,970 | B2 * | 11/2013 | Uno et al. .................. 363/21.15 |
| 8,830,702 | B2 | 9/2014 | Macfarlane |
| 2006/0255772 | A1 | 11/2006 | Chen |
| 2007/0036212 | A1 * | 2/2007 | Leung et al. .................. 375/238 |
| 2008/0252268 | A1 | 10/2008 | Feldtkeller et al. |
| 2011/0109283 | A1 | 5/2011 | Kapels et al. |
| 2011/0193494 | A1 * | 8/2011 | Gaknoki et al. ............. 315/297 |
| 2011/0205763 | A1 | 8/2011 | Artusi et al. |
| 2011/0280053 | A1 | 11/2011 | Halberstadt |
| 2012/0014150 | A1 | 1/2012 | Domb |
| 2012/0069615 | A1 | 3/2012 | Tomioka |
| 2012/0106216 | A1 | 5/2012 | Tzinker et al. |
| 2012/0120696 | A1 | 5/2012 | Nishijima |
| 2012/0126759 | A1 | 5/2012 | Lee et al. |
| 2012/0146529 | A1 | 6/2012 | Campbell et al. |
| 2012/0169313 | A1 | 7/2012 | Lee et al. |
| 2012/0187863 | A1 | 7/2012 | Nonaka et al. |
| 2013/0320882 | A1 * | 12/2013 | Gaknoki et al. ............... 315/307 |
| 2013/0322139 | A1 * | 12/2013 | Lee et al. ........................ 363/84 |
| 2014/0003105 | A1 | 1/2014 | Lin et al. |
| 2014/0078798 | A1 * | 3/2014 | Turchi ............................ 363/89 |
| 2014/0097808 | A1 | 4/2014 | Clark et al. |
| 2014/0328096 | A1 * | 11/2014 | Gumaer .......................... 363/89 |
| 2014/0328097 | A1 * | 11/2014 | Gumaer .......................... 363/89 |
| 2014/0328415 | A1 | 11/2014 | Gumaer |

FOREIGN PATENT DOCUMENTS

| | | |
|---|---|---|
| KR | 2009005011 | 5/2009 |
| SU | 288182 | 12/1970 |
| WO | 2005041393 | 5/2005 |

OTHER PUBLICATIONS

Lopatkina, R., International Search Report and Written Opinion of the International Searching Authority for PCT/US2014/036256, Sep. 17, 2014, pp. 1-7.

Golovinova, I., International Search Report and Written Opinion of the International Searching Authority for PCT/US2014/036252, Sep. 17, 2014, pp. 1-7.

Fairchild Semiconductor Corporation, Application Note 42047 Power Factor Correction (PFC) Basics, Aug. 19, 2004, 11 pages, Fairchild Semiconductor Corporation.

* cited by examiner

POWER FACTOR CORRECTION ALGORITHM FOR ARBITRARY INPUT WAVEFORM

TECHNICAL FIELD

The present disclosure relates generally to power factor correction. Specifically, the present disclosure relates to techniques for providing power factor correction for an arbitrary, periodic waveform source.

BACKGROUND

Power factor correction is often used in electric power systems and between power sources and loads in order to synchronize the input current and the input voltage before it is delivered to the load. Power factor correction can provide many benefits to the electric power system and the load, such as prolonged life and energy efficiency.

Traditionally, power factor correction circuitry is designed as voltage-based power factor correction. Such circuitry is used in constant voltage systems, and the input current waveform is made to match the input voltage waveform. Additionally, standard digital power factor correction methods utilize a 60 hertz sine wave as a reference to match the waveform of the input current to the input voltage. However, in certain industries, such as airfield lighting, the existing infrastructure requires current based systems which require a constant current power source rather than a constant voltage power source. Specifically, in the area of airfield lighting, constant current systems are traditionally used because of the need for consistent brightness across the plurality of light fixtures coupled in series and being powered by the same power source. Because a constant current power supply can provide the same level of current to each of the light fixtures, it became the standard form of power distribution in the area of airfield lighting. Though lighting technology has become more sophisticated, the infrastructure has remained a current based system. However, power factor correction techniques used for voltage based systems which receive a constant voltage generally cannot be used for current based systems. Furthermore, in airfield lighting systems and other constant current or constant voltage systems, many power sources do not supply a true sine wave input. For example, series-switch regulators used in airfield lighting are non-sinusoidal power sources. Other examples include emergency generators which may produce a sine wave, but at a varying frequency, and certain power inverters may produce square waveforms. However, traditional sine-based power factor correction requires the input waveform to be substantially similar to a sine wave for good power factor correction. The same challenge exists for power factor correction of constant-voltage systems when the input voltage is not a regular sinusoidal waveform. Thus, power factor correction of non-sinusoidal constant voltage or constant current inputs using the traditional sine-based method is limited or less efficient.

SUMMARY

In an example embodiment of the present disclosure, a power factor correction (PFC) circuit for arbitrary input waveforms includes a controller configured to receive an output signal from a PFC circuit and a reference signal. The controller compares the output signal and the reference signal and produces a feedback output, wherein the controller generates input reference data derived from an input source and multiplies the input reference data by the feedback output to produce a control signal. The input source is an arbitrary periodic waveform and the control signal controls and synchronizes an input signal to be in phase with the input source.

In another example embodiment of the present disclosure, a table method of controlling a power factor correction (PFC) circuit with arbitrary input waveforms includes sampling an input source at fixed intervals and storing the sampled values, dividing each sampled value by a cycle minimum to obtain a set of normalized values, and generating an input reference from the set of normalized values. The input reference is multiplied by a feedback controller output to obtain a control signal. The PFC circuit is controlled with the control signal, wherein the PFC circuit produces an input signal synchronized with the input source.

In another example embodiment of the present disclosure, an instantaneous method of controlling a power factor correction (PFC) circuit with arbitrary input waveforms includes sensing a first input power parameter, taking an instantaneous value of the first input power parameter at fixed intervals, and multiplying the instantaneous value of the first input power parameter by a feedback controller output to generate a control signal. The PFC circuit is controlled with the control signal, wherein a second input power parameter is synchronized with the first input power parameter.

BRIEF DESCRIPTION OF THE DRAWINGS

For a more complete understanding of the disclosure and the advantages thereof, reference is now made to the following description, in conjunction with the accompanying figures briefly described as follows.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of example embodiments of the present disclosure. Additionally, certain dimensions may be exaggerated to help visually convey such principles.

DETAILED DESCRIPTION OF EXAMPLE EMBODIMENTS

In the following paragraphs, the present disclosure will be described in further detail by way of examples with reference to the attached drawings. In the description, well known components, methods, and/or processing techniques are omitted or briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s). The present disclosure provides systems and methods of power factor correction for a power converter receiving an input having an arbitrary periodic waveform, operating on a constant current input source. The present disclosure describes a constant current power distribution system in the area of airfield lighting as an example application, but may be used with any other appropriate power distribution systems and loads operating on constant current or constant voltage input sources.

In certain example embodiments, the present disclosure provides a power factor correction circuit for systems receiving inputs having arbitrary waveforms. Arbitrary input waveforms as referenced herein refer either to non-sinusoidal waveforms or sinusoidal waveforms with irregular frequencies. The present disclosure provides a power factor correction circuit which applies an arbitrary waveform power factor correction algorithm to perform power factor correction of the arbitrary input waveform. The following discloses two example embodiments of the arbitrary waveform power factor correction algorithm and an example power factor correction circuit to be used With the algorithms for carrying out arbitrary waveform power factor correction. The disclosed power factor correction algorithms allow for high power factor correction on arbitrary waveform sources. In one example, the power factor correction circuit is used in an airfield lighting system which includes a plurality of individual light fixtures. Each of the light fixtures receives a constant current power supply from a central power source. In certain example embodiments, each or a subset of the light fixtures includes the power factor correction circuit disclosed herein, which improves the energy efficiency of the light fixtures.

Figure 1:
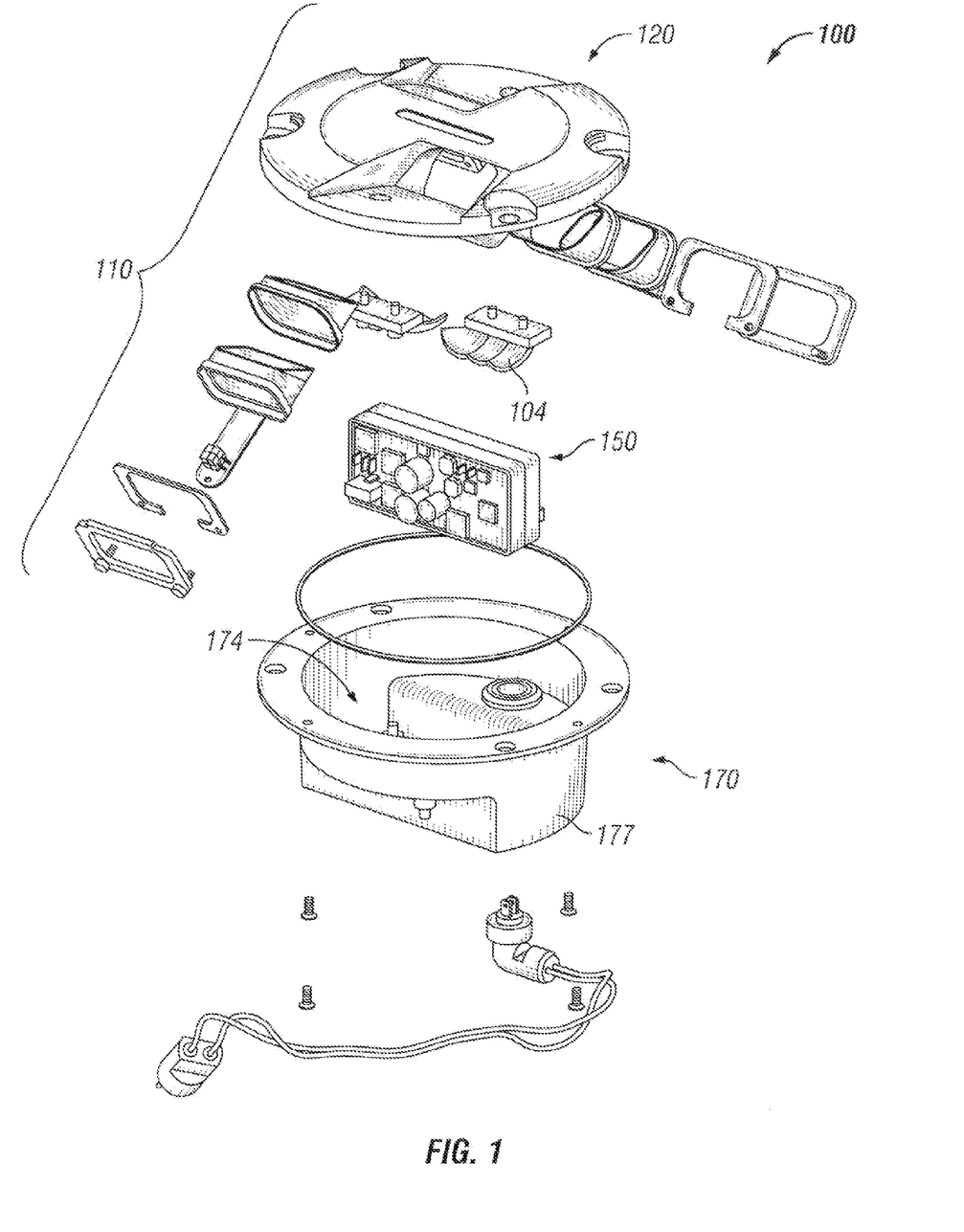
FIG. 1 illustrates a light fixture having a power factor correction circuit for arbitrary waveforms, in accordance with an example embodiment of the present disclosure.

FIG. 1 shows an exploded perspective view of a light fixture 100 in accordance with certain example embodiments. Referring now to FIG. 1, the light fixture 100 is an example of an airport runway and/or taxi way light fixture. The light fixture 100 of FIG. 1 includes a frame, a light source 104, and a power supply 150. The frame can include a cover 170 and optical housing 120. The light fixture 100 further includes an optical housing assembly 110. The optical housing assembly 110 includes the combination of one or more components associated with the mechanical structure and configuration of the optical housing 120 and other optical components, such as a body, lens, diffuser, connectors, and the like.

In certain example embodiments, the cover 170 includes at least one wall 177 that forms a cavity 174. Inside of the cavity 174 can be positioned at least one or more light sources 104 and the power supply 150. The cover 170 can include one or more features (e.g., ledges, apertures) that allow the various components disposed in the cavity 174 to fit and maintain electrical, mechanical, and/or thermal coupling with each other. The optical housing 120 protects the components disposed within the cavity 174, and can also secure the light sources 104 and the other internal components 130.

The power supply 150 includes one or more circuits and electrical components configured to receive the constant current input from the central power source, condition the received current, and drive the light sources 104. In certain example embodiments, the power supply includes the power factor correction circuit disclosed herein, such that the input voltage is conditioned for power factor correction before it is supplied to the light sources 104, thereby improving energy efficiency. In certain example embodiments, the input current is an arbitrary periodic waveform rather than a pure sinusoid.

Figure 2:
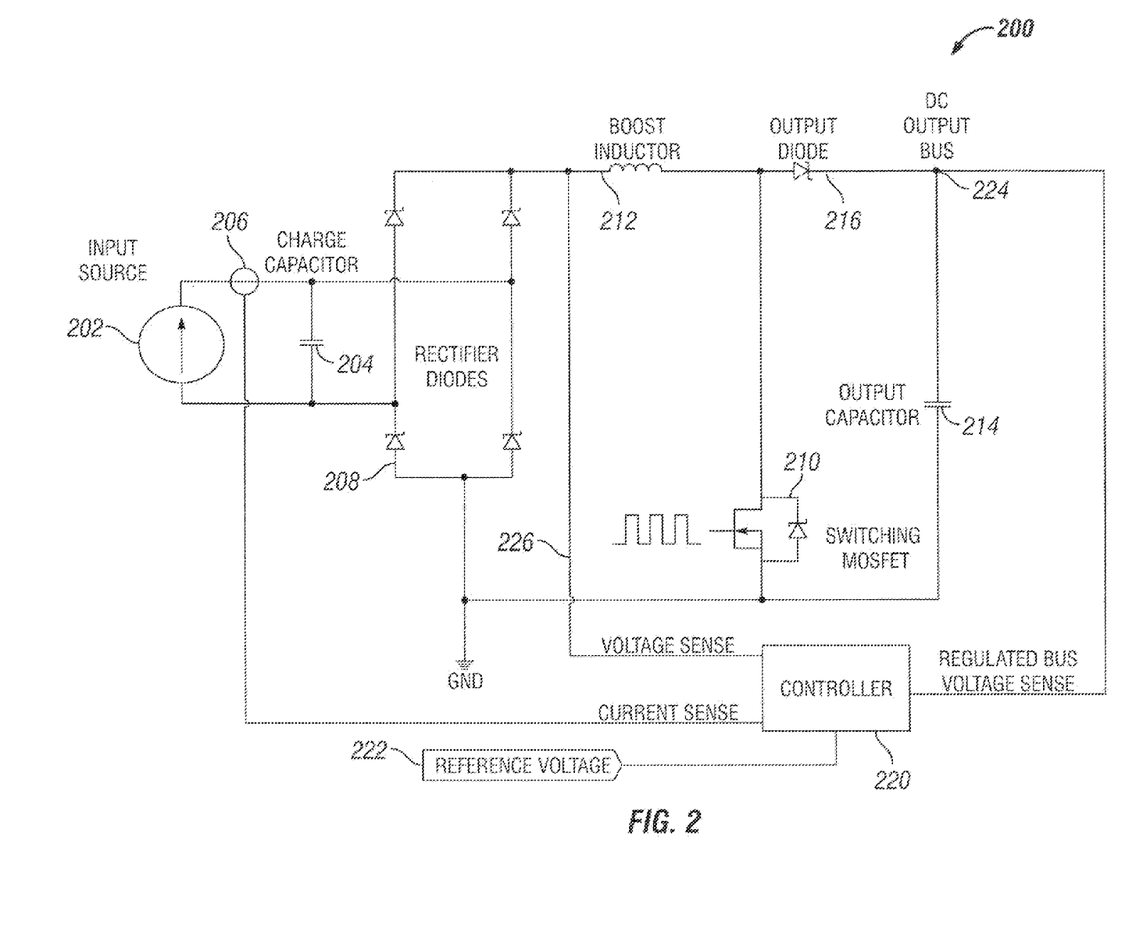
FIG. 2 illustrates a schematic diagram of a power factor correction circuit for arbitrary waveforms, in accordance with an example embodiment of the present disclosure.

FIG. 2 illustrates a schematic diagram of an example power factor correction (PFC) circuit 200, in accordance with an example embodiment of the present disclosure. It should be noted that the PFC circuit 200 of FIG. 2 is provided as an example only, and the techniques and methods provided in this disclosure can be implemented using many other PFC hardware and circuit configurations, including both constant current PFC circuits and constant voltage PFC circuits.

Referring to FIG. 2, in certain example embodiments, the PFC circuit 200 includes an input source 202, an input charging capacitor 204, a diode rectifier bridge 208, an inductor 212, a controller 220, a switching device 210, an output diode 216, an output capacitor 214, and a DC output bus 224. In an example embodiment, the input source 202 provides a constant current power supply to the circuit 200. In certain example embodiments, the input source 202 is an arbitrary waveform. In certain example embodiments, the input source 202 is directly coupled to the diode rectifier bridge 208 and the input charging capacitor 204. Thus, the input current is rectified by the diode rectifier bridge 208. The input current from the constant current input source 202 also charges the input charging capacitor 204 when the switching device 210 is off. In certain example embodiments, the switch device 210 is a switching MOSFET.

In certain example embodiments, the switching device 210 is initially off. Thus, the input current from the constant current input source 202 charges the input charging capacitor 104. As the input current charges the input charging capacitor 204, a voltage rise occurs in the input charging capacitor 204. When the voltage rises to a certain threshold level, the switching device 210 is switched on. In certain example embodiments, the threshold level is determined by a reference voltage 222 such that the voltage at the input charging capacitor is allowed to rise until it reaches the level of the reference voltage 222. In certain example embodiments, the controller 220 provides the reference voltage 222 and also monitors a sensed voltage signal 226 of the voltage at the input charging capacitor 204. The controller 220 also receives a sensed current signal 206 from the input current. The reference voltage has an amplitude indicative of the desired output power level. The controller 220 will be described in further detail below with respect to FIG. 3.

When the voltage at the input charging capacitor 204 reaches the reference voltage 222, the switching device 210 is switched on. When the switching device 210 is switched on, current is drained from the input charging capacitor 204 and the voltage drops accordingly. Thus, voltage at the input charging capacitor 204 rises when the switching device 210 is off and drops when the switching device 210 is on, creating a waveform which follows the duty cycle of the switching device 210. During the time the switching device 210 is on, current rises in the inductor 212. Thus, when the switching device 210 is switched off again, the inductor flies back and delivers energy, which is rectified by the output diode 216, to the output capacitor 214. The voltage at the output capacitor 214 is provided to a DC output bus 224 and configured to be delivered to a load. As the switching device 210 switches at a high frequency (hundreds of kHz) according to a controlled duty cycle, the instantaneous voltage at the input charge capacitor 204 will match the reference voltage each cycle. Thus, an input voltage in which the waveform is matched to the waveform of the input current is created over time, despite the input current being an arbitrary waveform.

In another example embodiment, the controller 220 does not necessarily monitor the input voltage 226. Rather, the switching device is provided with a pulse width modulation signal shaped like a sine wave regardless of the input voltage, which forces the input voltage to take on a waveform as defined by the pulse width modulation signal.

Figure 3:
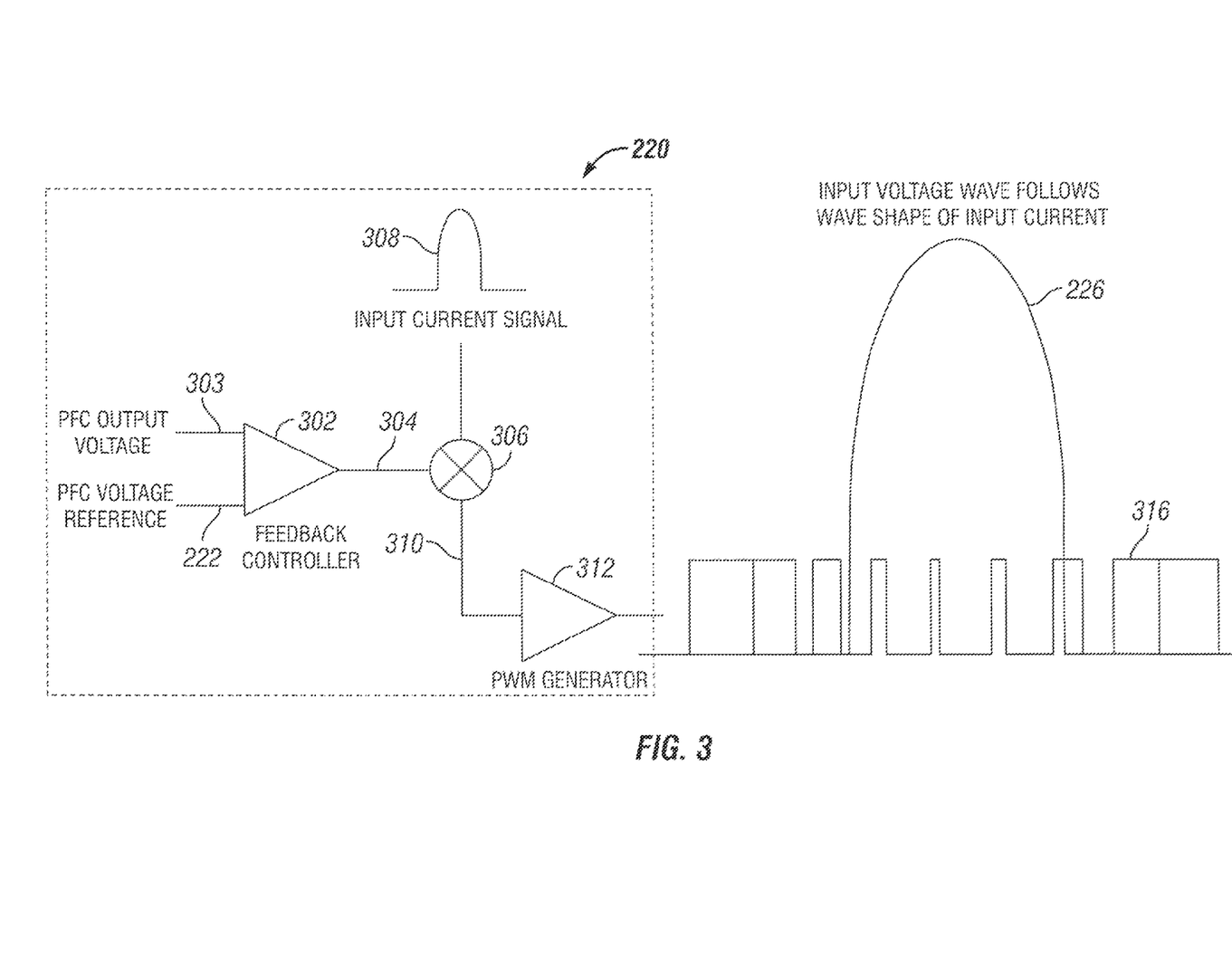
FIG. 3 illustrates a diagram of a controller of the power factor correction circuit for arbitrary waveforms of FIG. 1, in accordance with an example embodiment of the present disclosure.

FIG. 3 illustrates a diagrammatical representation of the controller 220 of FIG. 2, in accordance with an example embodiment. The controller 220 includes a feedback controller 302 which receives, as inputs, a sense output voltage 303 from the DC output bus 224 and the reference voltage 222. In certain example embodiments, the controller 220 is a digital controller 220 having an analog to digital converter, which senses and samples digital values of the output voltage and input current. The value of the reference voltage 222 is typically selected according to the desired amount of power to be provided at the DC output bus 224. The value of the sensed output voltage 303 is compared with the value of reference voltage 222. If the value of the sensed output voltage 303 is below the value of the reference voltage 222, the output 304 of the feedback controller 302 will increase. If the value of the sensed output voltage 303 is above the value of the reference voltage 222, the output 304 of the feedback controller 302 will decrease. The output 304 of the feedback controller 302 is then multiplied 306 by an input waveform reference table 308 to generate a control signal 310 which includes input waveform data and desired amplitude data. The controller 220 illustrated in FIG. 3 and described above is provided as an example controller in the context of a constant-current PFC circuit. However, in certain other example embodiments of the present disclosure, the controller operates in a constant voltage PFC circuit in which the controller controls the constant voltage PFC circuit to shape the input current to be synchronized with the input voltage, thereby providing voltage-based power factor correction.

In certain example embodiments, the reference table 308 is derived from the input waveform 206. Specifically, in an example embodiment, the reference table 308 is derived from sampling the input waveform 308 through a "table record method". In the table record method, the controller 220 initially acts as a standard controller to regulate the output voltage, providing a fixed duty cycle. During this time, the analog to digital converter in the controller 220 senses and stores digital values of the input current at fixed intervals. In certain example embodiments, in which the input source is a constant voltage source, the controller 220 initially regulates the input current with a fixed duty cycle. The controller 220 then senses and stores digital values of the input voltage at fixed intervals. Once a full cycle of input readings has been taken, the data is processed to create the reference table 308. Specifically, the sampled values are normalized by dividing each sampled value by the smallest value in the cycle, or cycle minimum, thereby generating the reference table 308. The reference table 308 is multiplied by the feedback controller output 304 to generate a control signal 310, which provides a duty cycle for controlling switching of the switching device 210. The control signal 310 also varies in amplitude with the feedback controller output 304. In certain example embodiments, the reference table 308 is synchronized with the input source 206 either by peak or zero-crossing detection. Additionally, in certain example embodiments, the reference table 308 is updated periodically to account for changes in the shape or frequency of the input source 206. Because the reference table 308 matches the arbitrary shape and frequency of the input source 206 waveform, a high power factor can be achieved. In certain example embodiments, the input source 206 is a constant current input. In certain other example embodiments, the input source 206 is a constant voltage input.

In another example embodiment, the reference table 308 is derived from the input source 206 through an "instantaneous normalized method". In the instantaneous normalized method, instead of sampling a series of values of the input source 206 (i.e., input current for constant current, input voltage for constant voltage), the controller 220 stores only the maximum input source value for each cycle. Then, at a given intervals, such as at fixed intervals where control algorithms are processed, the instantaneous value of the input source 206 is divided by the cycle maximum. The result of which is immediately multiplied by the feedback controller output 304 to produce an appropriate duty cycle for power factor correction.

In certain example embodiments, the controller 220 further includes a pulse width modulation (PWM) generator 312. The PWM generator 312 receives as input, the control signal 310, and converts the control signal 310 into a pulse width modulation signal 316. The pulse width modulation signal 316 is used to drive the switching device 210 (FIG. 2). In certain example embodiments, as in the example constant-current PFC circuit 200, the duty cycle of the pulse width modulation signal 316 decreases to increase the input voltage 226, and the pulse modulation signal 316 increases to decrease the input voltage 226. By using the PWM signal 316, which is derived from the control signal 310, to control switching of the switching device 210, the input voltage waveform is matched to that of the input current 206. For example, in a constant voltage system, the input current would be made to match the waveform of the input voltage.

Figure 4:
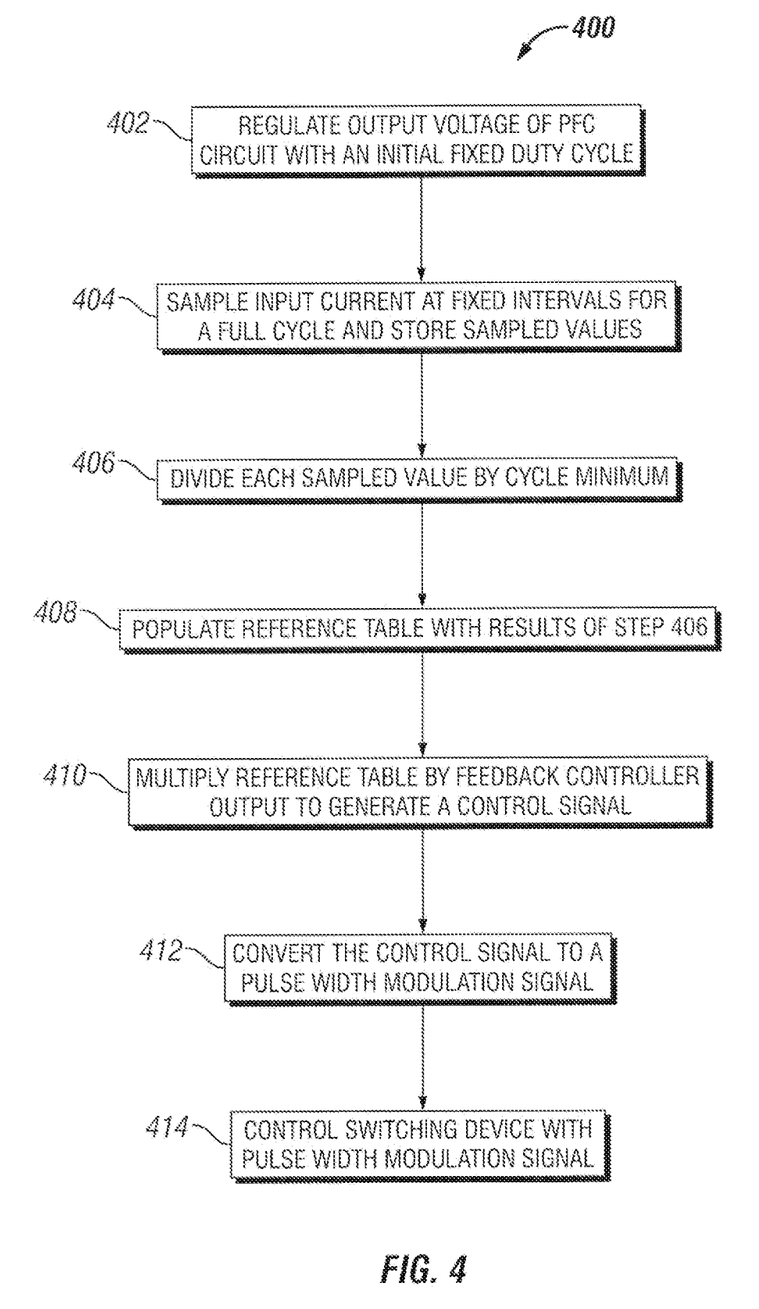
FIG. 4 illustrates a flow chart of a table record method of power factor correction for arbitrary waveforms, in accordance with an example embodiment of the present disclosure.

FIG. 4 illustrates the table record method 400 of power factor correction for an arbitrary input waveform, in accordance with an example embodiment. In certain example embodiments, the method 400 is embodied in an algorithm to be carried out by the controller 220 (FIG. 3) of the PFC circuit 200. The following description of the table record method 400 is described in the context of an example embodiment in which the input is a constant current source, and a matching input voltage waveform is to be generated. However, in other example embodiments, the table record method 400 is also used to generate an input current waveform synchronized with a constant voltage input. Referring to FIGS. 3 and 4, in an example embodiment, the method 400 includes regulating the output voltage of the PFC circuit 200 with an initial fixed duty cycle (step 402). The controller 220 then samples the input current at fixed intervals for a full cycle and stores the sampled values (step 404). The controller divides each stored value by the cycle minimum, of lowest stored value per cycle (step 406). The method 400 further includes populating the reference table 308 or an array with the results of step 406 (step 408). The reference table 308 is synchronized with the input current 206 either by peak or zero-current detection. In certain embodiments, the reference table 308 is also updated periodically to account for changes in the shape or frequency of the input current. The method also includes multiplying 306 the reference table 308 with the feedback controller output 304, which includes instructions for maintaining a desired amplitude of the input voltage (step 410). The output of the multiplication is the control signal 310. The method 400 further includes converting the control signal 310 into a corresponding pulse width modulation signal 316 (step 412). The pulse width modulation signal 316 is then used to control the switching device 210 (FIG. 2) such that the input voltage 226 is synchronized with the input current 206 (step 414).

Figure 5:
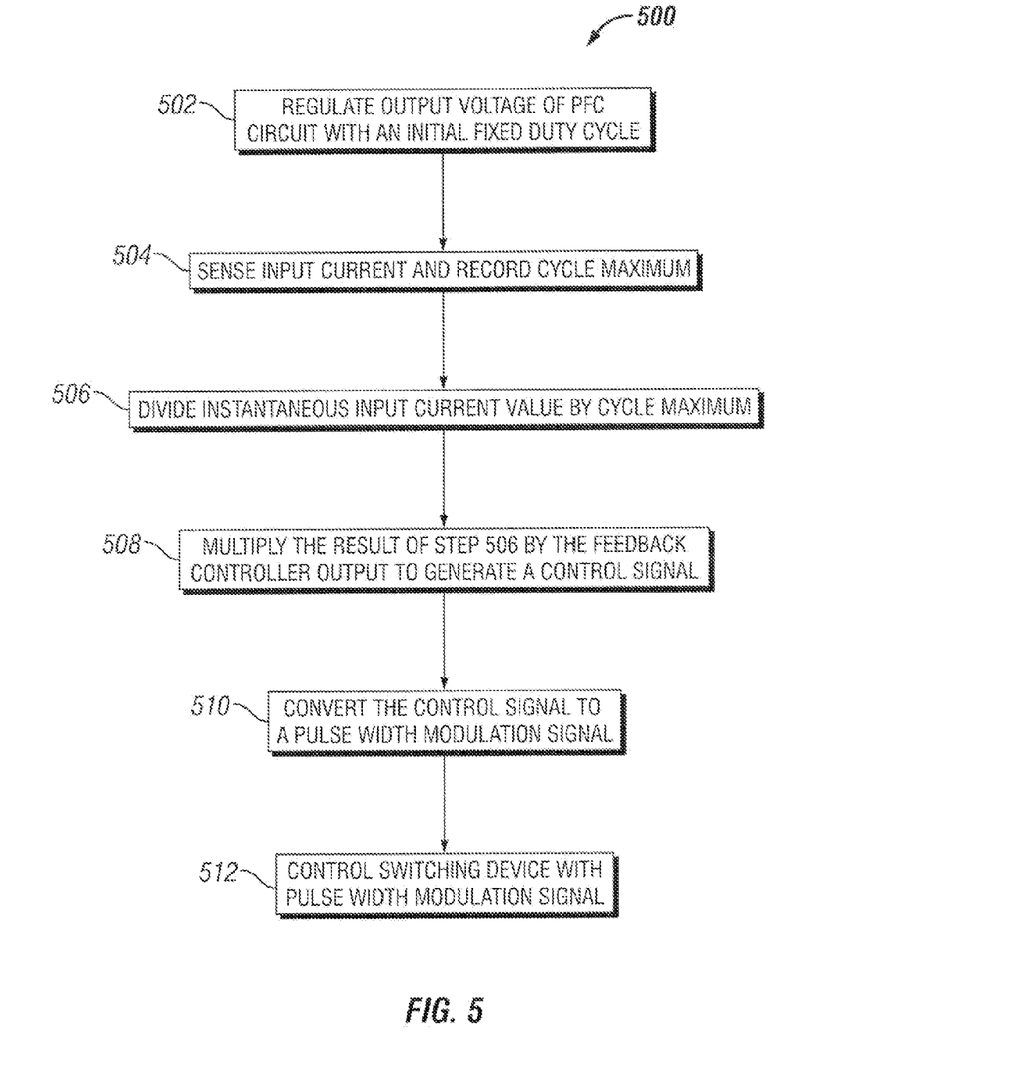
FIG. 5 illustrates a flow chart of an instantaneous normalized method of power factor correction for arbitrary waveforms, in accordance with an example embodiment of the present disclosure.

FIG. 5 illustrates the instantaneous normalized method 500 of power factor correction for an arbitrary input waveform. Again, the following example embodiment is based on a constant current system. However, in other example embodiments, the instantaneous normalized method 500 can also be used to generate an input current waveform synchronized with a constant voltage input. Like the table record method 400, the instantaneous normalized method 500 includes regulating the output voltage of the PFC circuit 200 with an initial fixed duty cycle (step 502). The controller 220 then senses the input current and records the normalized cycle maximum, or largest value in a cycle (step 504). Then, at determined intervals, the instantaneous value of the input current is divided by the normalized cycle maximum (step 506). The result of step 506 is immediately multiplied by the feedback controller output 304 to generate a control signal 310 (step 508). In certain example embodiments, the control signal 310 is converted into a pulse width modulation signal 316 (step 510). The pulse width modulation signal is then used to control the switching device 210 in order to generate an input voltage 226 that is synchronized with the input current 206 (step 512). With the table record method 400 and the instantaneous normalized method 500, the input voltage of a constant current power correction circuit is made to match and follow the phase of the constant current input current. Thus, power efficiency is improved.

The present disclosure provides techniques for power factor correction of arbitrary input sources. Although embodiments of the present disclosure have been described herein in detail, the descriptions are by way of example. The features of the disclosure described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

What is claimed is:

1. A power factor correction (PFC) circuit for arbitrary input waveforms, comprising:
   a controller configured to receive an output signal from a PFC circuit and a reference signal, wherein the controller compares the output signal and the reference signal and produces a feedback output, wherein the controller generates an input reference data derived from an input source and multiplies the input reference data by the feedback output to produce a control signal, wherein the input source is an arbitrary periodic waveform, and wherein the control signal controls and synchronizes an input signal to be in phase with the input source.

2. The power factor correction (PFC) circuit for arbitrary input waveforms of claim 1, wherein the input signal is an input voltage, and the input source is a constant input current.

3. The power factor correction (PFC) circuit for arbitrary input waveforms of claim 1, wherein the input signal is an input current and the input source in a constant input voltage.

4. The power factor correction (PFC) circuit for arbitrary input waveforms of claim 2, further comprising:
   a charge capacitor configured to receive the input current from a constant current source and produce the input voltage;
   a switching device coupled to the input capacitor, wherein the switching device is switchable between an OFF state and an ON state, wherein the input voltage rises when the switching device is in the OFF state and drains when the switching device is in the ON state; and
   wherein the controller synchronizes the input voltage to be in phase with the input current by controlling switching of the switching device.

5. The power factor correction (PFC) circuit for arbitrary input waveforms of claim 1, wherein the input reference comprises a set of digital values sampled from the input source at set intervals over at least a full cycle.

6. The power factor correction (PFC) circuit for arbitrary input waveforms of claim 1, wherein the digital values are normalized values.

7. The power factor correction (PFC) circuit for arbitrary input waveforms of claim 1, wherein the input reference is an instantaneous value of the input source normalized with a cycle maximum.

8. A table method of controlling a power factor correction (PFC) circuit with arbitrary input waveforms, comprising:
   sampling an input source at fixed intervals and storing the sampled values;
   dividing each sampled value by a cycle minimum to obtain a set of normalized values;
   generating an input reference from the set of normalized values;
   multiply the input reference by a feedback controller output to obtain a control signal; and
   controlling a PFC circuit with the control signal, wherein the PFC circuit produces an input signal synchronized with the input source.

9. The table method of controlling a power factor correction (PFC) circuit with arbitrary input waveforms of claim 8, further comprising:
   regulating an output signal of the PFC circuit with an initial fixed duty cycle.

10. The table method of controlling a power factor correction (PFC) circuit with arbitrary input waveforms of claim 8, further comprising:
    converting the control signal to a pulse width modulation (PWM) signal; and
    controlling the PFC circuit with the PWM signal.

11. The table method of controlling a power factor correction (PFC) circuit with arbitrary input waveforms of claim 8, wherein the input source is a constant input current and the input signal is an input voltage.

12. The table method of controlling a power factor correction (PFC) circuit with arbitrary input waveforms of claim 8, wherein the input source is a constant input voltage and the input signal is an input current.

13. The table method of controlling a power factor correction (PFC) circuit with arbitrary input waveforms of claim 8, further comprising:
    sampling an input source at fixed intervals over a full cycle.

14. The table method of controlling a power factor correction (PFC) circuit with arbitrary input waveforms of claim 8, further comprising:
    switching a switching device between an OFF state and an ON state according to the control signal, wherein the input signal rises when the switching device is in the OFF state and the drops when the switching device is in the ON state, wherein the input signal is synchronized with the input source by phase.

15. The table method of controlling a power factor correction (PFC) circuit with arbitrary input waveforms of claim 8, wherein the feedback controller output is obtained by comparing an output voltage of the PFC circuit and a reference voltage, wherein the feedback controller output increases when the output voltage is lower than the reference voltage, and the feedback controller output decreases when the output voltage is higher than the reference voltage, wherein the reference voltage represents a desired power level of the output voltage.

16. An instantaneous method of controlling a power factor correction (PFC) circuit with arbitrary input waveforms, comprising:

sensing a first input power parameter;

taking an instantaneous value of the first input power parameter at fixed intervals;

multiplying the instantaneous value of the first input power parameter by a feedback controller output to generate a control signal; and controlling a PFC circuit with the control signal, wherein a second input power parameter is synchronized with the first input power parameters.

17. The instantaneous method of controlling a power factor correction (PFC) circuit with arbitrary input waveforms of claim 16, further comprising:

recording a cycle maximum of the first input power parameter; and dividing the instantaneous value of the first input power parameter by the cycle maximum.

18. The instantaneous method of controlling a power factor correction (PFC) circuit with arbitrary input waveforms of claim 16, wherein the first input power parameter is a constant input current and the second input power parameter is an input voltage.

19. The instantaneous method of controlling a power factor correction (PFC) circuit with arbitrary input waveforms of claim 16, wherein the first input power parameter is a constant input voltage and the second input power parameter is an input current.

20. The instantaneous method of controlling a power factor correction (PFC) circuit with arbitrary input waveforms of claim 16, further comprising:

switching a switching device between an OFF state and an ON state according to the control signal, wherein the second input power parameter rises when the switching device is in the OFF state and the drops when the switching device is in the On state, wherein the second input power parameter is synchronized with the first input power parameter.

\* \* \* \* \*